United States Patent
Platz

(12) United States Patent (10) Patent No.: US 6,813,957 B1
Platz (45) Date of Patent: Nov. 9, 2004

(54) CAPACITIVE SENSOR ON A TRANSPARENT CARRIER

(76) Inventor: Karl-Otto Platz, Eckenhagener Strasse 16, 51580 Reichshof (DE)

( * ) Notice: Subject to any disclaimer, the term of this patent is extended or adjusted under 35 U.S.C. 154(b) by 87 days.

(21) Appl. No.: 10/148,130

(22) PCT Filed: Nov. 27, 2000

(86) PCT No.: PCT/EP00/11857

§ 371 (c)(1),
(2), (4) Date: Sep. 30, 2002

(87) PCT Pub. No.: WO01/38841

PCT Pub. Date: May 31, 2001

(30) Foreign Application Priority Data

Nov. 26, 1999 (DE) .......................................... 299 20 733

(51) Int. Cl.⁷ ................................................ G01B 7/16
(52) U.S. Cl. ....................................................... 73/780
(58) Field of Search .............................. 73/780, 862.68, 73/855, 862.337, 862.628

(56) References Cited

U.S. PATENT DOCUMENTS

| | | | | |
|---|---|---|---|---|
| 4,228,534 A | * | 10/1980 | Fellrath et al. | ............. 368/224 |
| 4,571,624 A | * | 2/1986 | Nishizawa et al. | ......... 348/307 |
| 4,810,060 A | * | 3/1989 | Ukai | ........................... 349/43 |
| 4,931,782 A | * | 6/1990 | Jackson | ...................... 345/174 |
| 5,954,850 A | * | 9/1999 | Bernot et al. | ................ 65/60.1 |
| 6,327,376 B1 | * | 12/2001 | Harkin | ....................... 382/124 |

* cited by examiner

*Primary Examiner*—Max Noori
(74) *Attorney, Agent, or Firm*—Diller, Ramik & Wight

(57) ABSTRACT

In a capacitive sensor on at least one carrier (2, 4) made of transparent material, e. g. glass, it is provided that the transparent carrier (2,4) comprises an electrically conducting transparent layer (6,10) which serves as a transparent sensor surface.

6 Claims, 2 Drawing Sheets

CAPACITIVE SENSOR ON A TRANSPARENT CARRIER

BACKGROUND OF THE INVENTION

The invention relates to a capacitive sensor.

Such sensors can be used on glass surfaces on which switching functions are to be performed.

SUMMARY OF THE INVENTION

It is an object of the invention to provide a capacitive sensor which allows an approach to said sensor to be sensed on a carrier of transparent material, e. g. glass. Another object is to perform a localization of the approach.

The invention advantageously provides for the transparent carrier material to comprise an electrically conducting layer which serves as a transparent sensor surface.

The electrically conducting layer comprises terminal lines.

The electrically conducting layer can be capacitively and contactlessly coupled into an electrical field of a second sensor surface which is provided in the vicinity in an immediately connected relationship.

The electrically conducting layer can be subdivided by incorporated insulation paths into different portions, wherein independent capacitive sensors are connected to each separate sensor surface. Due to the subdivision by the insulation paths line-type sensor paths are formed.

Between the sensor surfaces narrow separating surfaces may be arranged which are grounded so as to be neutral.

Each electrically conducting layer may be coated with a transparent scratch-resistant insulating layer.

The carrier may be made of tempered glass or compound glass.

In a preferred embodiment a plurality of electrically conducting transparent layers are provided whose capacitive functions penetrate each other.

Further, a plurality of transparent carriers each having an electrically conducting layer may be placed one upon the other.

According to another alternative it is provided that a single transparent carrier comprises a plurality of electrically conducting transparent layers placed one upon the other, said layers been separated by insulating intermediate layers.

Hereunder embodiments of the invention are explained in detail with reference to the drawings in which:

Figure 1:
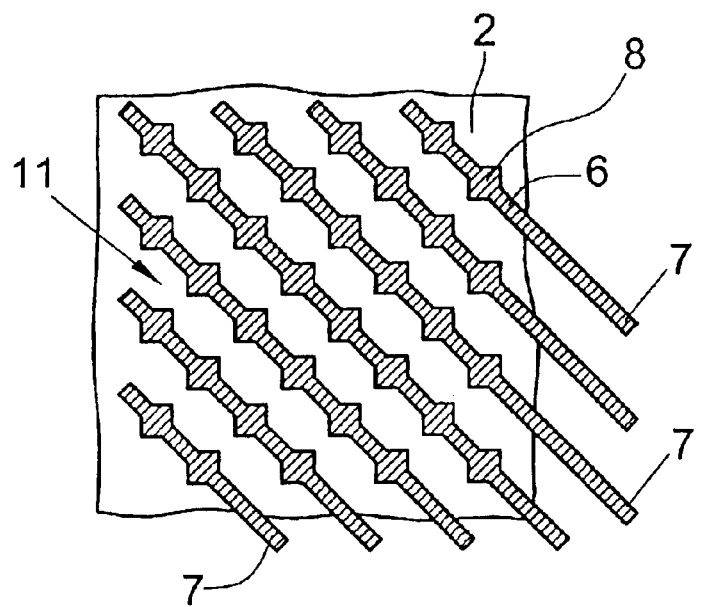
FIG. 1 shows a first capacitive sensor with diagonally extending electrically conducting transparent layers (sensor lines)
Figure 2:
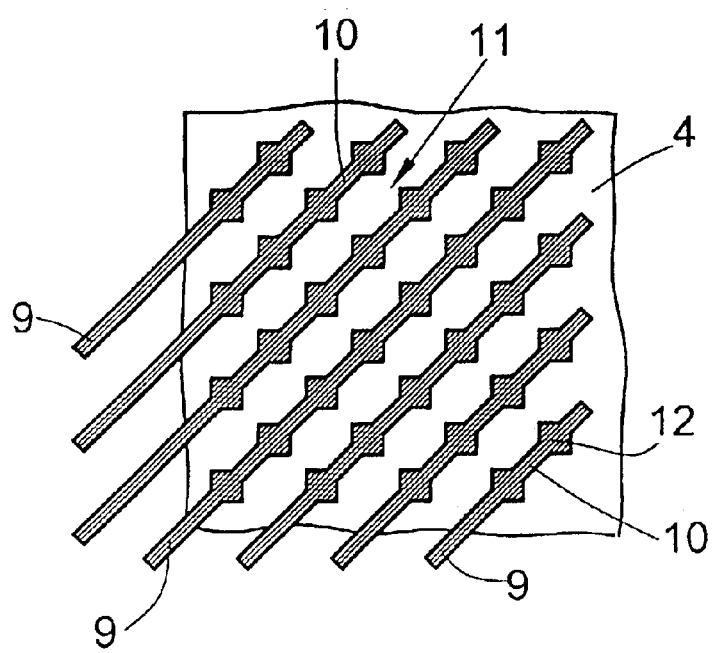
FIG. 2 shows a second transparent carrier with transparent electrically conducting layers extending in opposite direction.
Figure 3:
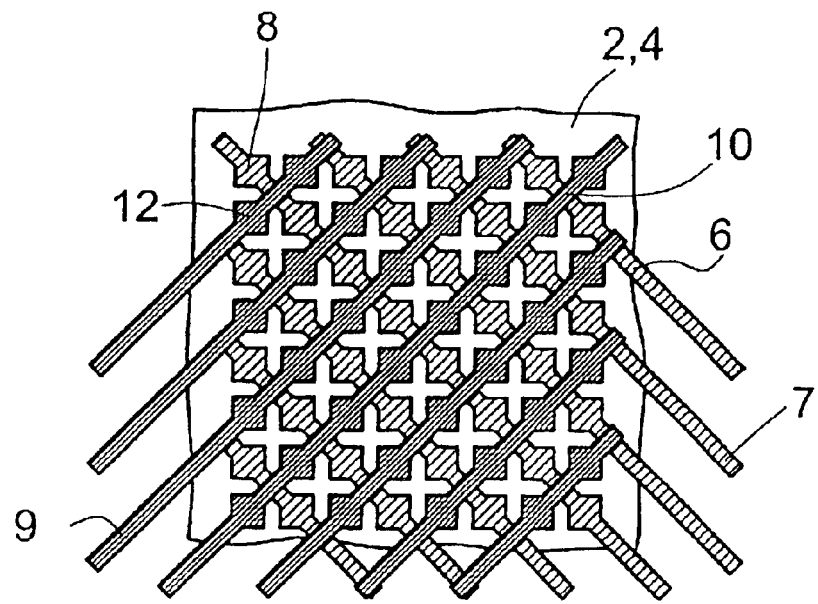
FIG. 3 shows an embodiment of a capacitive complete sensor for localization of a contact.

The functional principle is based upon a transparent carrier material (e. g. glass) being coated with a transparent conducting material (e. g. indium tin oxide—ITO coating). This conducting coating is electrically contacted and serves as a transparent sensor surface for a capacitive proximity switch.

Contacting may be effected in the form of direct contacting by means of soldering or glueing to glass, heat-seal technique, conducting adhesive strips, coatings capable of being soldered, silver printing, or the like. Further, electrical contacting of the sensor surface can be effected in a contactless manner by capacitively coupling the coating into an electrical field of a sensor surface located in the vicinity in directly connected relationship. This can be effected by recalibration of the original sensor surface and can be carried out during operation of an electronic circuit.

Localization of an approach of e. g. a hand to the sensor surface is realized by subdividing the conducting transparent coating by incorporated insulation paths 11 Into different portions and connecting independent capacitive sensors to each separate sensor surface. For definite separation and prevention of mutual coupling-in a relatively narrow separation surface may remain between two sensor surfaces, which separation surface is grounded so as to be neutral, if necessary.

A capacitive glass sensor applying the aforementioned functional principle can be constructed in two ways:

1. The construction can be effected on a single transparent glass carrier 2 which performs the function and may be combined with further glass panes, pockets between glass panes and/or backings to form an end product. The carrier 2,4 of a transparent sensor surface may also be made of tempered glass or compound glass.

The conducting coating and the transparent carrier material are considered to be a single-layer circuit board, and accordingly the individual sensor surfaces 6,10 are worked out of the conducting coating.

All sensor surfaces 6,10 always extend parallel to each other.

A final transparent coating of a scratch-resistant and insulating material, e. g. aluminium oxide, prevents the conducting layers from being damaged.

2. The functional principle of the single-layer configuration can be linked by combination of a plurality of single layers such that not every sensor surface requires an individual capacitive electronic sensor, but a line and column array minimizes the amount of electronics. Each line and each column is provided with its own capacitive sensor which reduces e .g. the amount of electronics for 16 keys in a 4×4 matrix to eight capacitive sensors. Further, the amount of contacting on the transparent sensor surface is reduced.

It is of importance with regard to the localization process that the capacitive functions of different sensor surfaces (on the different planes) penetrate each other and create an invisible common three-dimensional functional space.

The various active planes of the sensor surfaces can be produced by means of different processes, e. g.:

a) by placing one upon the other a plurality of transparent carriers 2,4 with conducting coatings according to the principle described under 1., or b) by coating a transparent layer 2,4 several times with a conducting transparent material, using an insulating intermediate coating, if necessary.

When the construction according to variant a) is employed, a multilayered and extremely stable compound glass can be produced e. g. using glass as the carrier material, where the conducting sensor surfaces are located on the inside of the glass and are thus completely scratch-resistant and arranged such that any direct access to the sensor surfaces is prevented. The capacitively active field thus works through the material thickness of the glass. The two transparent carriers 2,4 made of glass can be connected with each other in different ways: by applying the compound glass technique using a PVB film, the encapsulating technique using a transparent encapsulating material, the insulating glass technique using an air gap, loosely placed one upon the other, or adhered to each other by a suitable adhesive. Any screen printing between the transparent layers may be opaque, translucent and/or partly applied. Between or behind the glass panes the transparent sensor may be connected with a functional layer which allows changeable transmission of the overall setup.

When a plurality of conducting layers are used on a transparent carrier 2,4, the aforementioned setup possibilities apply mutatis mutandis. Generally, the conducting layer of the first sensor surface is applied first and then subdivided into a plurality of sensor surfaces 8,12 or sensor paths according to requirement. Subsequently, an insulating transparent coating is applied on which, during the third working cycle, a second electrically conducting layer forms the next sensor surface. The latter can also be subdivided. At option further layers may follow which can be protected by a final insulating coating on the surface, if necessary.

For the sake of simplicity only the construction with two separate carrier materials is described below:

In the first carrier 2 diagonally extending active capacitive sensors are formed whose active surfaces have regular enlarged portions in the form of enlargements 8,12 at which this diagonal sensor path 6,10 is particularly sensitive and has a more strongly active capacitive field. Thus an irregular capacitive full-face sensor has already been formed. Each diagonal sensor path 6,10 is connected to its own capacitive sensor.

Here, each hatched area forms a coherent active surface 6,10, which surfaces are defined in the remaining surface of the conducting coating by an insulation path 11. The longer diagonals are the terminal lines 7,9 to the connecting cable, which terminal lines are centrally merged for each glass. The diagonals are to be made as narrow as possible between the enlargements 8,12; in the drawings they are shown superproportionally enlarged.

In the second carrier 4, too, sensors are formed, but turned by 90 in such a way that the enlargements 8,12 of both sensor planes supplement each other to form a full-face pattern.

If these two sensor planes are placed one upon the other in a precisely fitting manner, a capacitive complete sensor is created which allows, via evaluation of the diagonal columns and diagonal lines on the carriers 2,4, localization of the contact.

An approach in a crossing point is now ideally sensed by two capacitive planar enlargements 8 in a diagonal line and two capacitive planar enlargements 12 in a diagonal column. Via the evaluation of line and column signals the position is obtained.

The enlargements 8 of the rear carrier 2 are located behind a nonactive surface of the front carrier 4. To allow active detection of an approach without any electrical screening by the nonactive layer located in front, this nonactive surface of the front carrier 4 can be coupled into a capacitive field and can practially be used, too. This is, however, to be possible only locally over the respective rear carrier 2 enlargement currently In use. Therefore the nonactive surface of the front carrier 4 (between the diagonal columns) is divided into islands 16 which can be coupled into the enlargements 8 of the rear carrier 2. Further, a marginal area is provided about each island 16, which marginal area is connected to mass. In this way coupling of the islands 16 into the enlargements of the same sensor plane is prevented.

FIG. 1 shows the active diagonal lines of a carrier 2 with enlargements 8.

Figure 4:
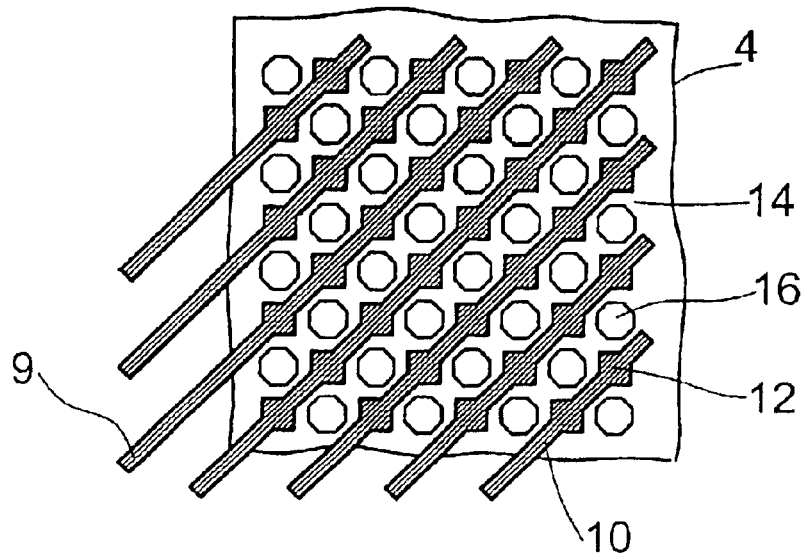
FIG. 4 shows an embodiment of a capacitive sensor with island-like nonactive surfaces.

The octagons in the embodiment of FIG. 4 shows islands 16 between the active lines, which islands can be coupled into the enlargements lying behind them In the next carrier 2.

The intermediate space between the islands 16 and the electrically conducting layers 10 is grounded.

To allow a multilayer carrier (e. g. compound glass) to be operated from both sides, the second carrier has the same construction, i. e. it also possesses islands 16 and a grounded intermediate space.

Besides the known advantages of a glass surface (scratch resistance, resistance to acid, alkaline solutions, oils, greases, UV-resistance, option of antireflection coating) the capacitive glass sensor offers further advantages owing to its specific construction:

in a compound glass construction contacting can simply be effected through a hole bored into the rear glass pane without the stability being substantially affected;

the electronic switching system is always relay-controlled and can thus be used for direct power-switching;

it is possible to install the sensor surface flush with a front plate;

curved, bent, bored and free glass forms are possible;

wear-resisting operating surface;

resistant to vandalism;

splinterproof due to compound glass construction;

increased resistance to shock due to tempering of the glass;

the sensor can be produced with free glass edges all around;

contacting of the sensor surface can be attained by simply placing the coupling-in sources.

The capacitive glass sensor can e. g. be used in glass panes of a motor vehicle. It can further be used in glass panes of a shower cabinet. The glass sensor can further be provided on its rear side with an exciter for transmission of acoustical information.

Although a preferred embodiment of the invention has been specifically illustrated and described herein, it is to be understood that minor variations may be made in the apparatus without departing from the spirit and scope of the invention, as defined by the appended claims.

I claim:

1. A capacitive sensor comprising at least one carrier (2, 4) made of transparent material, said at least one transparent material carrier (2,4) including a plurality of electrically conducting transparent layers (6, 10) defining a transparent sensor surface, said plurality of electrically conducting transparent layers (6, 10) establish capacitive functions which penetrate each other, said plurality of electrically conducting transparent layers extend diagonally, and two sensor surfaces lying one upon the other establish path-type electrically conducting layers (6, 10) diagonally extending in opposite directions.

2. A capacitive sensor comprising at least one carrier (2, 4) made of transparent material, said at least one transparent material carrier (2, 4) Including an electrically conducting transparent layer (6, 10) defining a transparent sensor surface, said electrically conducting transparent layers (6, 10) being subdivided by a plurality of insulation paths (11)

into separate sensor surfaces, independent capacitive sensors being connected to each separate sensor surface, and said electrically conducting transparent layer (6, 10) includes enlargements (8, 12).

3. The capacitive sensor as defined in claim 2 wherein the electrically conducting transparent layers (6, 10) of neighbouring sensor surfaces cross each other between respective enlargements (8, 12).

4. A capacitive sensor comprising at least one carrier (2, 4) made of transparent material, said at least one transparent material carrier (2,4) including a plurality of electrically conducting transparent layers (6, 10) defining a transparent sensor surface, said plurality of electrically conducting transparent layers extend diagonally, and two sensors lying one upon the other establish path-type electrically conducting layers (6, 10) diagonally extending in opposite directions.

5. A capacitive sensor comprising at least one carrier (2, 4) made of transparent material, said at least one transparent material carrier (2, 4) including an electrically conducting transparent layer (6, 10) defining a transparent sensor surface, and said electrically conducting transparent layer (6, 10) includes enlargements (8, 12).

6. The capacitive sensor as defined in claim 5 wherein electrically conducting transparent layers (6, 10) of neighbouring sensor surfaces cross each other between respective enlargements (8, 12).

* * * * *